May 5, 1970     G. W. NICHOLS     3,510,664
AUTOMATIC LASER BEAM SCANNING FILM FLAW DETECTOR
Filed Jan. 8, 1968     2 Sheets-Sheet 1
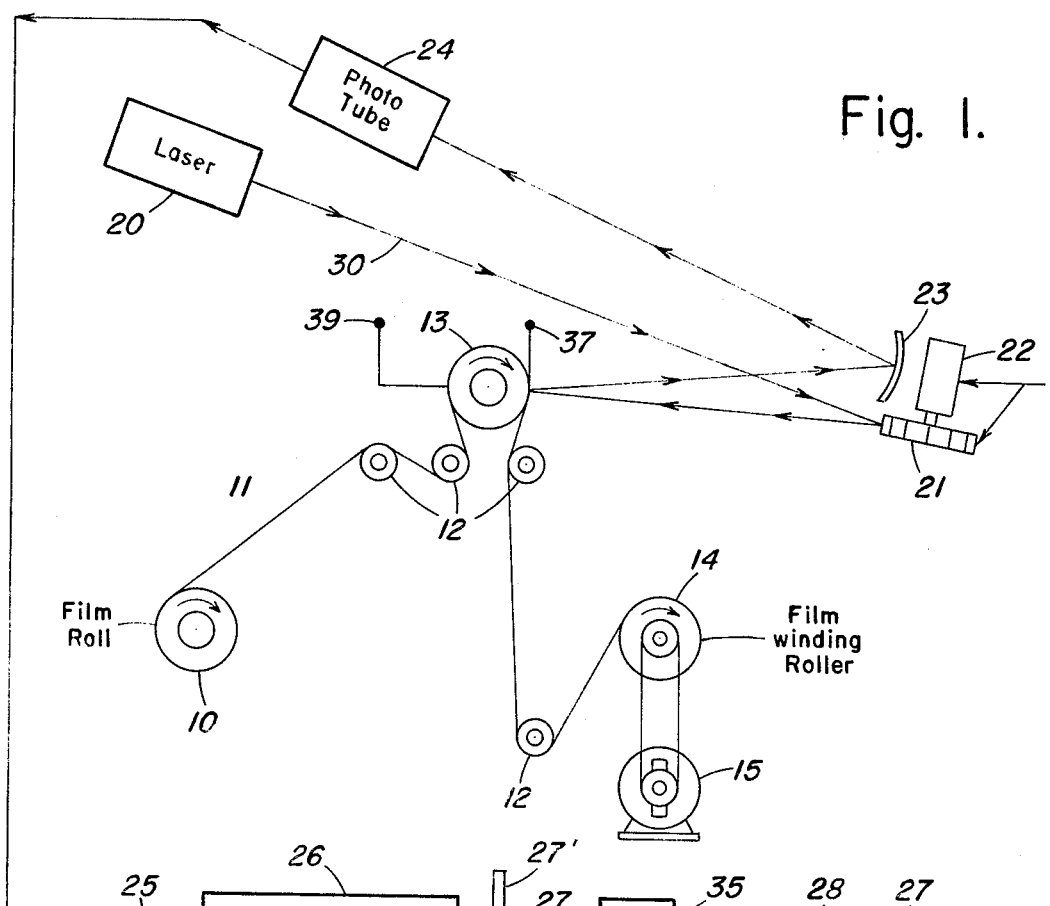
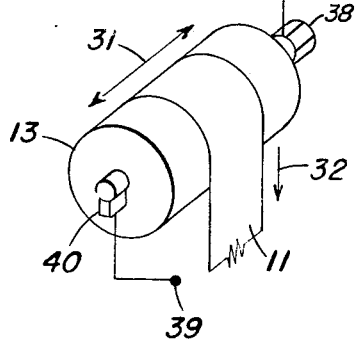
INVENTOR.
Gordon W. Nichols
BY
ATTORNEY May 5, 1970  G. W. NICHOLS  3,510,664
AUTOMATIC LASER BEAM SCANNING FILM FLAW DETECTOR
Filed Jan. 8, 1968  2 Sheets-Sheet 2
Fig. 4.
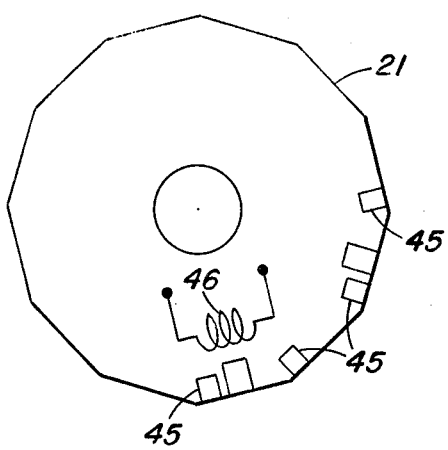
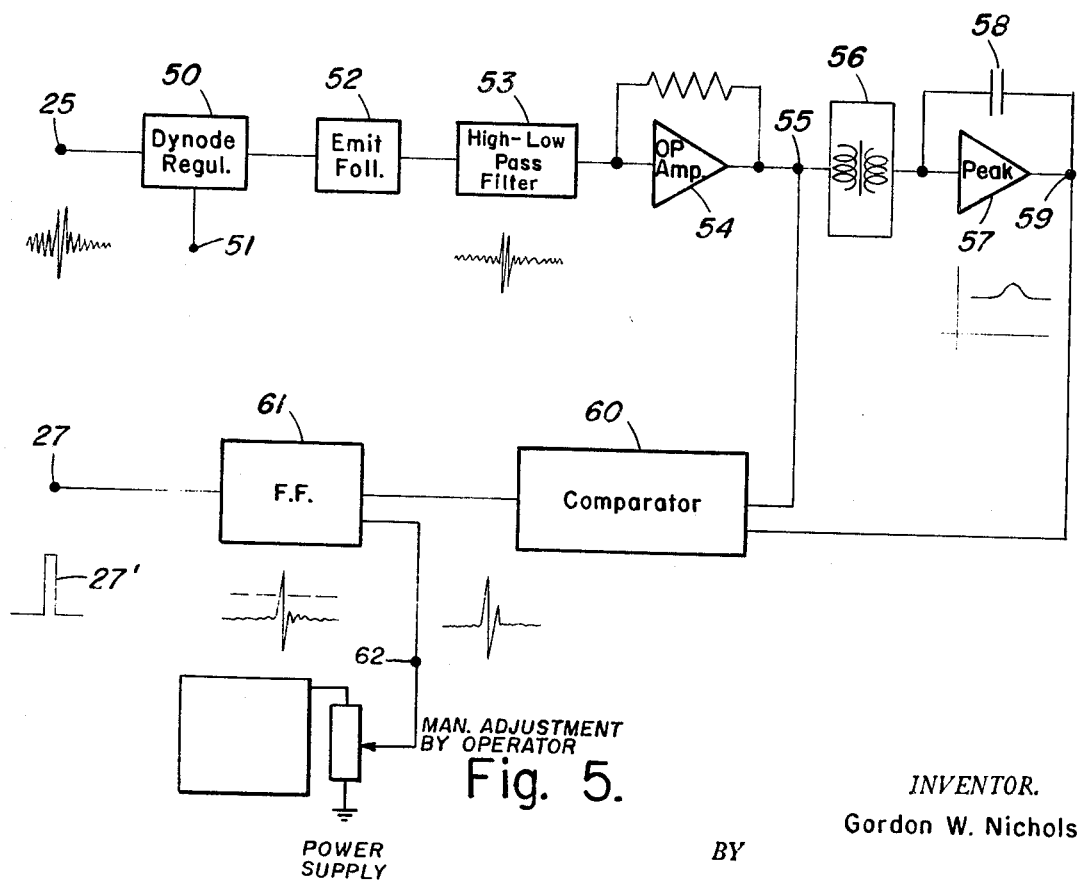
Fig. 5.
INVENTOR.
Gordon W. Nichols
BY
ATTORNEY United States Patent Office 3,510,664
Patented May 5, 1970

3,510,664
AUTOMATIC LASER BEAM SCANNING FILM
FLAW DETECTOR
Gordon W. Nichols, Binghamton, N.Y., assignor to GAF
Corporation, a corporation of Delaware
Filed Jan. 8, 1968, Ser. No. 696,284
Int. Cl. H01j 39/12; G01n 21/16, 21/30
U.S. Cl. 250—217                              11 Claims

ABSTRACT OF THE DISCLOSURE

A laser beam is scanned across a guide roller over which the film runs; at the beginning and end of each scan, a sharp pulse will be generated due to the discontinuity of the film with respect to the guide drum; these pulses will be similar to defect pulses. All pulses, for each scan, are applied to a count-to-three counter; if the count-to-three counter reaches three, a defect is indicated otherwise, if only two counts are reached, only the beginning and end have been detected. A reset is provided actuated by the scanning mechanism, so that the testing apparatus is non-responsive to edge discontinuity, independently of film width. The pulses are dynamically compared with noise signals to eliminate response to stray pulses.

---

The present invention relates to film testing apparatus and more particularly to apparatus to test film which is essentially red-blind, such as photographic paper, X-ray film and other photographic products.

In testing the continuity of photographic products, it has been found that a laser beam, for example as generated by a helium-neon laser and having a wave length of 6328 A. is particularly useful. The intensity of such a beam is high so that it can be scanned rapidly, yet because of the single wave length characteristic of such beams, fogging of the film is essentially eliminated.

In the testing of film by means of a beam of radiation, it has previously been proposed to scan the beam across the film. The film is usually wound over a testing roller or drum and the beam is directed thereunto; a reflected beam is then picked up and directed to a light-sensitive transducer, such as a photomultiplier tube. If a film defect is sensed, a sharp pulse will be obtained from electronic pulse shaping circuitry connected to the photomultiplier tube, which sharp pulse can be utilized to energize an alarm system, a recorder or the like.

When a sharply collimated, high intensity beam is used, such as a laser beam, it has been found that the edges of the film running over the roller give outputs which are similar to defects. Filtering of these outputs by mechanical means has proved difficult since the film may wander slightly laterally of the drum. The problem thus has been, that if the scanning for defect is started late enough to avoid any pulses from the film edge, some defects on the film itself can be missed; on the other hand, if the scanning is adjusted accurately to match the width of the film, slight wandering of the film laterally of the roller or testing drum will cause signals to appear indicating defects, although no defects are present and the film merely shifted laterally.

The scanning beam provides only one spot of light on the film at any one time. Upon striking the film, the beam is slightly decollimated, since the film is not a mirror surface. The beam, reflected from the film material to be tested, is then directed towards an electro-optical transducer, such as a photomultiplier tube. Since the film is not a mirror surface, and further moves over a roller, the decollimation and movement will introduce noise and slight variations in signal output from the photomultiplier tube, although the film may be perfect.

Upon sensing a defect in the film, such as a tear or absence of coating material, or some other physical discontinuity, will cause a sharp change in reflectivity and thus a sharp difference in output from the photomultiplier tube. Since laser beams can be made to be very small, discontinuities of even lesser size than the beam spot size can readily be detected.

Briefly, therefore, in accordance with the present invention, a fiilm testing apparatus is provided in which a laser beam is scanned across the film. The pulses obtained from the laser beam, as it strikes the discontinuity provided by the film over the roller, are used to operate a counter. The counter is set to count at least to three. If the counter reaches the count of three, at each scan, a defect is indicated. Normally, only the beginning of the film and the end of the film will be indicated by a pulse; should a defect occur, a third pulse will be present (the third actual pulse indicating the end of the film, the intermediate pulse indicating the defect) and when the counter reaches its terminal count to three, it can indicate an alarm or recording or similar mechanism.

Reset of the counter can be done in various ways; a separate light-sensitive cell can be arranged adjacent the drum, still within the scanning field, to reset the counter either at the end of the scan, or at the beginning of a next one; or, if a mechanical scanning mirror is used, pulses can be obtained from the mechanical scanning mirror by placing small magnets at the edge thereof, to sweep past a coil, to serve as a source for reset pulses.

In order to better distinguish between noise and wanted defect signals, the beam is directed into a light-sensitive element. Its output is passed to a peak holding operational amplifier and the averaged signal from the peak holding operational amplifier is compared with the input thereto to provide a dynamic reference of average noise. The compared signal is then utilized to trigger the counter.

It is therefore an object of the present invention to provide a film testing apparatus utilizing a high intensity, highly collimated beam of a wave length to which the material is insensitive, and which is capable of testing materials of different widths.

It is still another object to provide a film testing apparatus which can operate with a higher concentration of light in the red region to test red-blind products, by means of beams having a very narrow spectral band width.

It is a further object of the present invention to provide a film testing apparatus having no mechanical adjustable parts, and still being capable of accommodating films of various widths.

It is a further object of the present invention to provide a film testing apparatus in which a high intensity beam is scanned across a film web, and the number of defects in any scan can be recorded.

It is a still further object of the invention to provide a film testing apparatus which can rapidly test wide films without danger of fogging of the products being tested.

It is still another object of the present invention to provide film testing apparatus which is simple, efficient, and not subject to mechanical misalignments.

These and other objects and many of the attendant advantages of this invention will be readily appreciated as the same becomes better understood by reference to the following detailed description when considered in connection with the accompanying drawings, in which:

FIG. 1 is a schematic diagram of the film testing apparatus of the present invention;

FIG. 1a is a circuit diagram of the count-to-three flip-flop counter.

FIG. 2 is a perspective view of a film guide drum, schematically indicating scanning direction and film travel;

FIG. 3 is a partial view of the counting system including a defect location recorder;

FIG. 4 is a schematic top view of a scanning mirror with a reset pulse source; and FIG. 5 is a block diagram of the electronic part of the testing system.

Referring now to the drawings, wherein like reference characters designate like or corresponding parts throughout the several views, FIG. 1 illustrates, in general form, the apparatus as a whole. A film supply roll 10 supplies a web of film 11 over idler rollers 12 to a film testing drum 13. The film is guided over the drum 13, seen in greater detail in FIG. 2, and then passes to a film take-up or wind-up roller 14, driven in conventional form by a motor 15.

A laser 20 provides a laser beam 30 of collimated light, and having a spot size of approximately 2 mm. diameter. The beam 30 is directed to a 12-sided mirror 21, driven by a motor 22 for example at 3,600 r.p.m., so that a scanning rate of 43,200 times per minute is obtained. Beam 30 is reflected by mirror 21 and directed towards the film web 11, scanning across the film 11 as indicated by arrow 31. The film web 11 travels around roller 13 as indicated by arrow 32. The beam, reflected from the roller, or the film as the case may be is picked up by a spherical mirror 23, and directed towards a light-sensitive pick-up device, such as a photomultiplier tube 24. The output of tube 24, appearing at a terminal 25 is applied to an electronic detection unit 26, the output of which appears at a terminal 27. Each substantial change in light, such as for example caused by the scan of the beam traveling from the drum to the film, or by a defect in the film will cause a pulse to appear at the output of electronic detection unit 26, as schematically indicated by the wave form 27'. Pulses 27', appearing at terminal 27 are applied to a count-to-three counter 32 which, if it operates in the binary system, will have a pair of counting units, such as flip-flops 33, 34 as schematically indicated. If flip-flop 34 is activated, that is if the counter 32 does count to three, it activates a gate 35 and causes an alarm signal to appear at alarm terminal 28.

At the beginning of each scan, or at the end of each scan, counter 32 is reset by a signal applied to reset terminal 37. This reset pulse can be obtained, for example, by optical means including a photo-sensitive device 38 located next to the drum, but still within the field of scan and to be impinged by beam 30 as it scans across the drum—see FIG. 2. Thus, each time the beam 30 falls on the device 38, a reset signal is produced.

As the beam scans across web 11, in the direction of arrow 31, it will first cause a pulse 27' to appear as it travels from the drum 13 to the web 11. This will cause counter 32 to count to one. If the web is perfect and there is no defect, a second pulse will occur as the beam leaves the edge of the web 11 and again impinges on the drum 13. This will cause the counter 32 to advance to a count of two. The beam then scans across, impinges on photoelectric element 38, causing a reset pulse to appear at terminal 37 which is applied to reset the counter 32 to zero, so that a new scan will start a new count.

If the film should have a defect, the second count of the counter will be caused by the defect and, as the beam leaves the edge of the film web 11, the counter 32 will advance to a third count, thus setting flip-flop 34. This will open gate 35 and cause an alarm signal at terminal 28. If more than one defect is present, of course, a similar alarm will be given.

FIG. 3 illustrates an embodiment of the invention in which the actual numbers of defects, for any one scan, are counted. The counter, if in binary form, will be able to count to eight, as schematically indicated by the presence of three internal counting elements in FIG. 3. The counter, 32' in FIG. 3, can be connected to a recorder 41 where the number of defects are recorded. The recorder 41 may, likewise, have an input applied thereto at a terminal 39 which corresponds to the position of the web 11 traveling around drum 13. Such a position-responsive signal can be obtained for example, from a revolution counter, schematically indicated at 40 (FIG. 2). Thus, recorder 41 can provide an output indicating not only the number of defects, but also where they occur from a given starting point.

The reset pulses applied to terminal 37 can be obtained photoelectrically, as above indicated; various other ways of obtaining reset pulses are also possible. FIG. 4 illustrates an electromagnetic system. The mirror 21 is provided with small magnets 45, attached to the edges of the mirror, which sweep past a detection coil 46, providing a reset pulse each time that a mirror face reaches scanning position.

The apparatus of the present invention operates entirely on the numbers of pulses sensed and it is independent of the width of the web 11. Thus, adjustments to blank the laser beam 30, or to blank the electronic detection unit 26 so that the pulses 27', derived from the edges of the film 11 are not recorded or do not appear at terminal 27, are unnecessary. On the contrary, the edge-originated pulses from the web are used to control the operation of the counter, which provides an alarm signal when the count exceeds the two necessary edge signals due to the left and right edges of the web 11.

FIG. 5 illustrates the electronic unit 26, which includes a dynode regulator 50 for the photomultiplier tube 24. Such a regulator may, for example, have the construction illustrated and described in detail in connection with application No. 689,960 filed Dec. 12, 1967, and assigned to the assignee of the present invention. A reference potential, schematically indicated by terminal 51, keeps the photomultiplier tube 24 always in its most favorabe operating range. The output from dynode regulator 50 is applied to an emitter follower 52, and from there through a high-low pass filter 53. The waves appearing at the various elements are indicated immediately beneath the schematic blocks. The low-high pass filter 53 has its output connected to an operational amplifier 54, having a feedback resistance to obtain amplification of about 100. The output from the operational amplifier 54, appearing at a terminal 55, is applied by transformer coupling, schematically indicated by a coupling transformer 56 to a peak holding operational amplifier 57. The peak holding operational amplifier 57 provides an output which is proportional to the average peak inut apearing thereat within in a time determined by condenser 58. The outut of the peak holding operational amplifier 57, appearing at terminal 59, as well as the output of operational amplifier 54, are both applied as inputs to comparator 60. Comparator 60 compares the average peak of the signal applied thereto from terminal 59 with the instantaneous values available at terminal 55 and will thus filter out all unwanted noise signals and provide outputs only if a sharply determined peak indicative of a defect in the film passing over the scanning drum is detected. The output from comparator 60 is applied to a monostable multivibrator, or flip-flop 61, the output of which, at terminal 27, is utilized to operate the counter or other mechanism.

The emitter follower 52 is desirable to impedance match the output of dynode regulator 50 to the filter 53 and the operational amplifier 54. As can be seen from the wave forms beneath the emitter follower and the filter, some very high and very low frequencies are suppressed, but the output from the filter still contains sufficient noise so that a defect signal which is not as sharp and as pronounced as that shown in FIG. 2 for purposes of illustration could be hidden among the average noise. By comparing the output of peak holding amplifier 57 with the output from operational amplifier 54, that is with the signal appearing at terminal 55, a sharply defined peak will appear at the output of comparator 60, which can readily be converted into a signal pulse 27' of square wave shape.

To further distinguish from noise, a source of threshold potential 62 is connected to the monostable multivibrator 61, to set a lower limit below which the flip-flop 61 will not respond. This lower threshold value is indicated at 63 in the wave form next to flip-flop 61 and further reduces the possibility of spurious response or indication of a defect when actually there was no defect present in the film.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. Film testing apparatus comprising a laser providing a laser beam;
   guide means having a film web to be tested passing thereover;
   means directing said beam towards said guide means and scanning said beam over the film web passing over said guide means;
   light-sensitive circuit means for detecting a beam of reflected light from said film and providing an electrical output signal whenever there is a substantial change in the reflected light beam detected thereby, such as that produced by the two lateral edges of the web and a flaw therein resulting from each scan;
   a counter responsive to each of said output signals;
   wherein the improvement comprises:
   means providing an alarm whenever the output signal count of said counter reaches three; and
   reset means for automatically resetting said counter to zero after each scan of said laser beam.

2. Apparatus as defined in claim 1, wherein said counter is a flip-flop circuit.

3. Apparatus as defined in claim 1, including a recorder circuit for recording the output signal counts of said counter for each scan.

4. Apparatus as defined in claim 1, wherein said reset means includes optical means comprising a photosensitive device located adjacent said guide means and in light-receiving relation to said beam at a terminal end of a scan for producing a reset signal when activated by said beam.

5. Apparatus as defined in claim 1, wherein said reset means includes electromagnetic means coupled to said scanning means and providing a reset pulse for each scan.

6. Film testing apparatus as defined in claim 1, further comprising:
   signal pulse peak holding circuit means connected to said light-sensitive circuit means to obtain a modified output signal representative of average noise;
   comparator circuit means having one output connected to said light-sensitive circuit means and a second output responsive to said modified output signal to compare instantaneous signals with average noise signals; and
   means developing an alarm signal from the output from said comparator.

7. Testing apparatus as defined in claim 6, including an operational amplifier conected to the output of said light-sensitive circuit means and providing said electrical output signal.

8. Testing apparatus as defined in claim 7, wherein said signal pulse peak holding circuit is a second operational amplifier providing a direct current signal representative of time average peak noise.

9. Testing apparatus as defined in claim 6, including a source of threshold potential, said threshold potential being compared with the output from said comparator so that the alarm signal is provided only when the output from said comparator exceeds the value of said threshold potential.

10. Testing apparatus as defined in claim 1, including a high-low pass filter in the output from said light-sensitive means to provide filtering for very high and very low frequencies.

11. Density testing apparatus to test a moving web of film comprising:
    a laser providing a laser beam directed towards said moving web;
    light-sensitive circuit means for detecting the beam reflected from said web of film and providing an electrical output signal source;
    noise signal discriminating means connected to said light-sensitive circuit means and providing a pulse output only when said reflected laser beam strikes a discontinuity;
    wherein the improvement comprises:
    a pulse counter circuit responsive to said pulse output;
    means providing an alarm whenever the count of said output signal reaches three; and
    reset circuit means for resetting said pulse counter after each scan of said laser beam.

References Cited

UNITED STATES PATENTS

| | | | |
|---|---|---|---|
| 3,026,415 | 3/1962 | Lake et al. | 250—219 X |
| 3,198,951 | 8/1965 | Lentze | 250—219 |

RALPH G. NILSON, Primary Examiner

T. N. GRIGSBY, Assistant Examiner

U.S. Cl. X.R.

250—83.3, 209, 214, 219 223; 356—209, 237